United States Patent
Liu

(10) Patent No.: US 9,753,701 B2
(45) Date of Patent: Sep. 5, 2017

(54) GENERATING LOGIC WITH SCRIPTING LANGUAGE IN SOFTWARE AS A SERVICE ENTERPRISE RESOURCE PLANNING

(71) Applicant: SAP SE, Walldorf (DE)

(72) Inventor: Yingqiao Liu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/964,993

(22) Filed: Dec. 10, 2015

(65) Prior Publication Data

US 2017/0168783 A1    Jun. 15, 2017

(51) Int. Cl.
   *G06F 9/44*    (2006.01)

(52) U.S. Cl.
   CPC .   *G06F 8/34* (2013.01); *G06F 8/38* (2013.01)

(58) Field of Classification Search
   CPC .................................................. G06F 8/34
   See application file for complete search history.

(56) References Cited

U.S. PATENT DOCUMENTS

| | | | |
|---|---|---|---|
| 5,541,986 A * | 7/1996 | Hou ................. | H04M 3/42178 379/201.03 |
| 7,725,605 B2 | 5/2010 | Palmeri et al. | |
| 8,782,785 B2 | 7/2014 | Casalaina et al. | |
| 9,535,934 B1 * | 1/2017 | Bahl ................. | G06F 17/30294 |
| 2002/0091533 A1 * | 7/2002 | Ims ................. | G06Q 30/06 709/230 |
| 2004/0068527 A1 * | 4/2004 | Smith, III ........ | G06F 17/30855 |
| 2006/0026018 A1 * | 2/2006 | Exner .............. | G06Q 30/02 709/206 |
| 2006/0031225 A1 * | 2/2006 | Palmeri ........... | G06F 17/30566 |
| 2006/0053120 A1 * | 3/2006 | Shum .............. | G06Q 30/02 |
| 2007/0088707 A1 * | 4/2007 | Durgin ............ | G06F 17/30581 |
| 2007/0208605 A1 | 9/2007 | Ambrose et al. | |
| 2009/0259683 A1 | 10/2009 | Murty et al. | |
| 2013/0104100 A1 | 4/2013 | Mueller et al. | |
| 2013/0139132 A1 * | 5/2013 | Kass ............... | G06F 8/447 717/139 |
| 2013/0139164 A1 * | 5/2013 | Balko ............. | G06F 8/35 718/102 |
| 2013/0159981 A1 | 6/2013 | Klemenz et al. | |
| 2014/0344788 A1 * | 11/2014 | Rhoads ............ | G06F 11/3692 717/126 |

(Continued)

*Primary Examiner* — Chameli Das
(74) *Attorney, Agent, or Firm* — Brake Hughes Bellermann LLP

(57) ABSTRACT

Systems and methods are described for converting business logic architecture from a native language (e.g., processor compiled code) into a scripting language (e.g., scripted code) for software as a service (SaaS) delivery methods for enterprise resource planning. The systems and methods may include generating a plurality of business process patterns representing business logic associated with one or more of a plurality of business objects, obtaining a plurality of code portions that correspond to one or more of the plurality of business process patterns, the plurality of code portions being coded in a scripting language and stored in a script repository, defining at least one extension point for each business process pattern. Each extension point may represent an interface, within the business logic, in which to insert one or more of the plurality of code portions into processor-compiled architecture in a software application.

20 Claims, 9 Drawing Sheets

(56) References Cited

U.S. PATENT DOCUMENTS

2015/0067637 A1* 3/2015 Charfi ................... G06F 8/24
717/104
2015/0378756 A1* 12/2015 Lensmar ................ G06F 8/53
717/148

* cited by examiner

GENERATING LOGIC WITH SCRIPTING LANGUAGE IN SOFTWARE AS A SERVICE ENTERPRISE RESOURCE PLANNING

TECHNICAL FIELD

This description relates to software, computer systems, and computer implemented methods for translating software functionality.

BACKGROUND

Modern Enterprise Resource Planning (ERP) applications typically include multi-layered architecture. The multi-layered architecture can include a presentation layer, a service layer, a data access layer, and a business logic layer. The business logic layer can include business logic that may describe a sequence of operations associated with data accessible by an ERP application. In addition, the business logic layer may include core business logic, localization business logic and extensibility business logic, just to name a few examples.

SUMMARY

According to one general aspect, a system of one or more computers can be configured to perform particular operations or actions by virtue of having software, firmware, hardware, or a combination of them installed on the system that in operation causes or cause the system to perform the actions. One general aspect includes a computer-implemented method that includes generating, by a processor, a plurality of business process patterns representing business logic associated with one or more of a plurality of business objects, obtaining a plurality of code portions that correspond to one or more of the plurality of business process patterns. The plurality of code portions may be coded in a scripting language and stored in a script repository. The method may also include defining at least one extension point for each business process pattern in which each extension point represents an interface, within the business logic, in which to insert one or more of the plurality of code portions into processor-compiled architecture in a software application. The method further includes in response to receiving, at the processor, a request to execute a service associated with the software application, determining portions of the service that include business logic to be carried out by the processor-compiled architecture and determining other portions of the service that include business logic to be carried out by scripted architecture, and executing the service using a scripting language interface, the executing including organizing the portions of the service and the other portions of the service according to the business process pattern, and generating a function call to each portion of the service that includes business logic to be carried out by the processor-compiled architecture. The method also include generating a service call to the service by retrieving and executing at least one code portion from the script repository. Other embodiments of this aspect include corresponding computer systems, apparatus, and computer programs recorded on one or more computer storage devices, each configured to perform the actions of the methods.

Implementations may include one or more of the following features. Generating the plurality of business process patterns representing business logic associated with one or more of the plurality of business objects may include obtaining and parsing, by the processor, processor-compiled architecture in an enterprise resource planning application to define a generic process, determining that an update to the business logic is available, and generating additional code portions in a scripting language to implement the update to the business logic. The additional code portions may be architected based on the business process pattern and adapted to replace a part of the processor-compiled architecture. In some implementations, each business process pattern includes an ordered template for generating code portions, in a scripting language, for executing a portion of the business logic. In some implementations, at least one extension point is configured to be a placeholder for inserting one or more code portions into processor-compiled architecture in an enterprise resource planning software application. In some implementations, retrieving the at least one code portion from the script repository includes retrieving code configured for user preference data corresponding to the business process.

In some implementations, the method may also include embedding a scripting language runtime into the software application where the scripting language runtime is configured to execute the at least one code portion and the embedding limits memory resources that the scripting language runtime consumes during execution. The method may also include during execution of the business process and at each extension point, performing a search in the script repository to find a plurality of relevant code portions that correspond to a selected business process pattern and selecting two or more code portions to be executed based on the selected business process pattern.

In some implementations, the scripting language may be an open source embedded scripting language and exchange of data between scripting language architecture and the processor-compiled architecture is performed using a virtual stack having a plurality of slots, where each slot is configured to hold a value of scripting language architecture to offset a mismatch between automatic and manual resource management. Implementations of the described techniques may include hardware, a method or process, or computer software on a computer-accessible medium.

In another general aspect, a system may include a scripting engine configured to cause at least one processor to generate a plurality of scripts for executing business logic associated with at least one software service. The scripts may be configured to replace a portion of processor-compiled architecture in a software application, the scripting engine configured to access. The system may also include an extension point generator configured to define a plurality of extension points corresponding to the business logic. The plurality of extension points may represent an interface, within the business logic, in which to insert at least one script of the plurality of scripts into the processor-compiled architecture. The system may additionally include a business logic analyzer configured to obtain and parse a plurality of executable code to define one or more generic processes for a plurality of software services and a virtual stack configured in a virtual machine to access the plurality of scripts and to exchange data between scripted architecture and the processor-compiled architecture, the virtual stack having a plurality of slots. In some implementations, each slot is configured to hold a value associated with the scripted architecture.

Implementations may include one or more of the following features. The system may also configure the scripting engine to cause the at least one processor to determine portions of the service that include business logic to be carried out by the processor-compiled architecture and determining other portions of the service that include business logic to be carried out by scripted architecture and to execute the service using a scripting language interface. Executing may include organizing the portions of the service and the other portions of the service according to the one or more generic processes. The system may additionally generate a function call to each portion of the service that includes business logic to be carried out by the processor-compiled architecture and generating a service call to the service by retrieving and executing at least one code portion from a script repository.

In some implementations, the system may also determine that an update to the business logic is available, generate a pattern for the one or more generic processes, and obtain one or more scripts in a scripting language to implement the update to the business logic according to the pattern. Obtaining the one or more scripts may include retrieving the at least one code portion from a script repository, the scripts being obtained based at least in part user preference data corresponding to a service request associated with the service.

In some implementations, the scripting engine is further configured to embed a scripting language runtime into the software application. The scripting language runtime may be configured to execute at least one script. Embedding may limit memory resources that the scripting language runtime consumes during execution.

In some implementations, the scripting engine is further configured to perform the following during execution of the service and at each extension point: perform a search in a script repository to select a plurality of relevant scripts that correspond to at least one generic process of the one or more generic processes, and select two or more scripts to be executed based on the at least one generic process.

Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

DETAILED DESCRIPTION

Figure 1A:
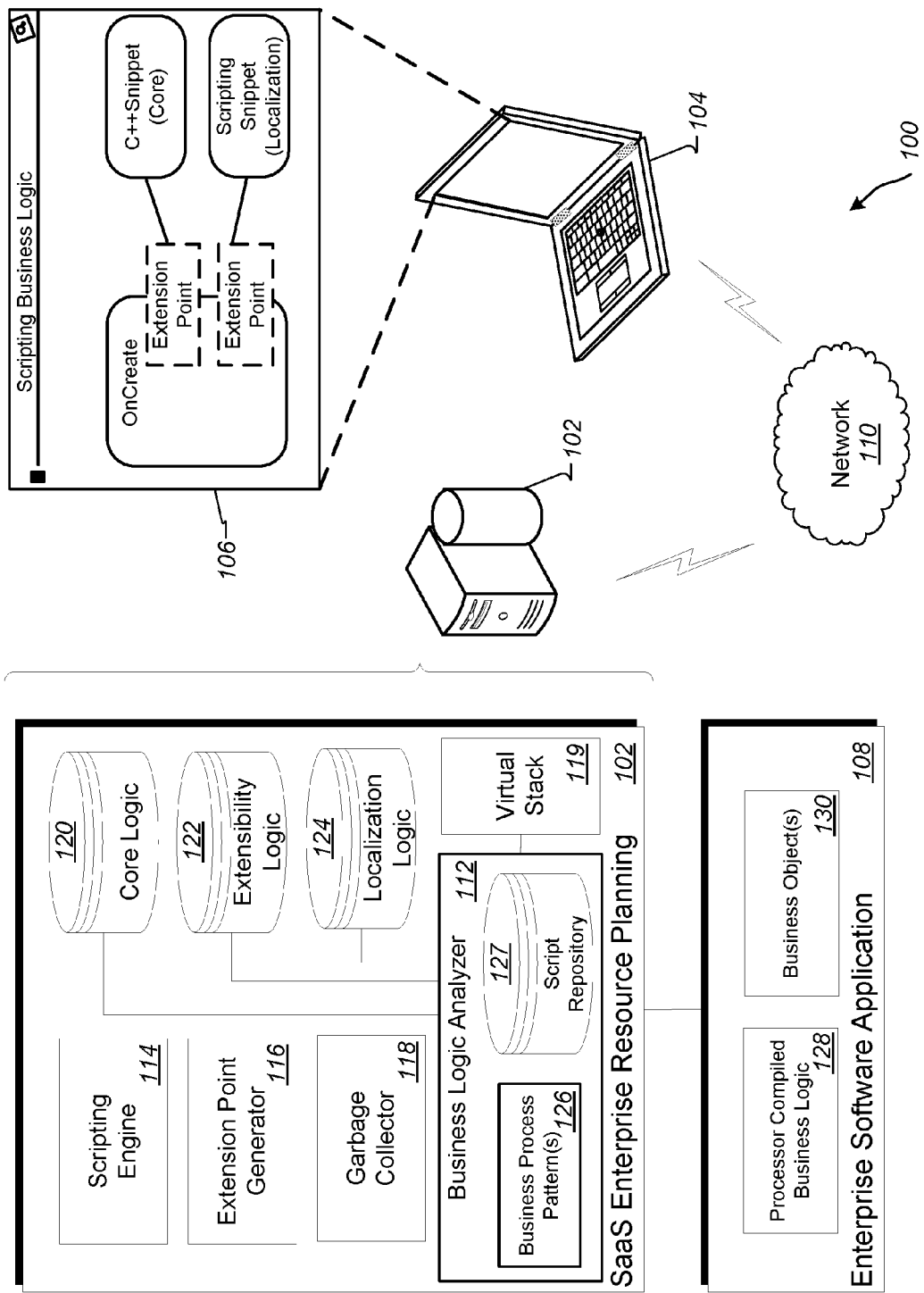
FIGS. 1A-1B are block diagrams of an example system for converting business logic architecture from a native language to a scripting language.

This document describes systems and techniques to convert business logic architecture from a native language (e.g., processor compiled code) into a scripting language (e.g., scripted code) for software as a service (SaaS) delivery methods for enterprise resource planning. The conversion can be performed while utilizing existing architecture and resources without interrupting service provision and application execution. Converting architecture from a native language into a scripting language can provide the advantage of executing fast-paced changes to business logic while reducing software costs. In addition, using a scripted language for generating business logic can ensure that processing and developer resources are not overconsumed while maintaining software service functionality.

The SaaS delivery model has become a commonly adopted model for business applications including Enterprise Resource Planning (ERP) applications. Often, business partners are choosing to forego or replace on-premise application software in favor of the SaaS delivery model. The SaaS delivery model for ERP software can be configured to host services (e.g., ERP software application interactions and related services) on one or more vendor or business partner servers. Using SaaS ERP software ensures that customers, business partners, and vendors can quickly modify business logic functionality without disrupting existing software functionality.

Switching from on-premise based software to SaaS based software generally includes performing modifications, updates, and transitions in software functions. The systems and methods described herein can perform such software modifications, updates, and transitions, as changes are requested by customers, vendors, and/or business partners without interrupting the flow of particular underlying business processes. For example, the systems and methods described herein can generate business logic in a scripting language to replace software functionality that was originally coded in a processor-compiled language for on-premise application software.

In some implementations, the systems and methods described herein can use existing software architecture and process flows to develop business logic code in a scripting language while leveraging portions of the existing software architecture and process flows. In one example, business logic can be generated in a scripting language in order to replace portions of business logic previously generated with object-oriented programming (e.g., or other processor-compiled programming languages). Such replacements can be performed without infraction of the currently functioning and operating software. In addition, the systems and methods described herein can leverage existing assets (architecture, infrastructure, and framework) in order to reuse such assets. This can provide an advantage of efficiently reusing software components that have been tested with existing customers while making updates to software components and services (or service calls) in a non-disruptive fashion.

In some implementations, the systems and methods described herein function to normalize business processes by tailoring a scripting language for the purpose of developing business logic for an SaaS ERP software application. By normalizing business flows (i.e., architecture of business processes), open source scripting language embedded via virtual machine can be used to generate business logic scripts in an SaaS ERP application for core, localization, and extensibility business logic. The scripts can function in the system in a non-disruptive way and particular portions of existing business logic can be refracted in a piece-wise process in order to be replaced with scripts without creating compatibility errors.

Figure 1B:
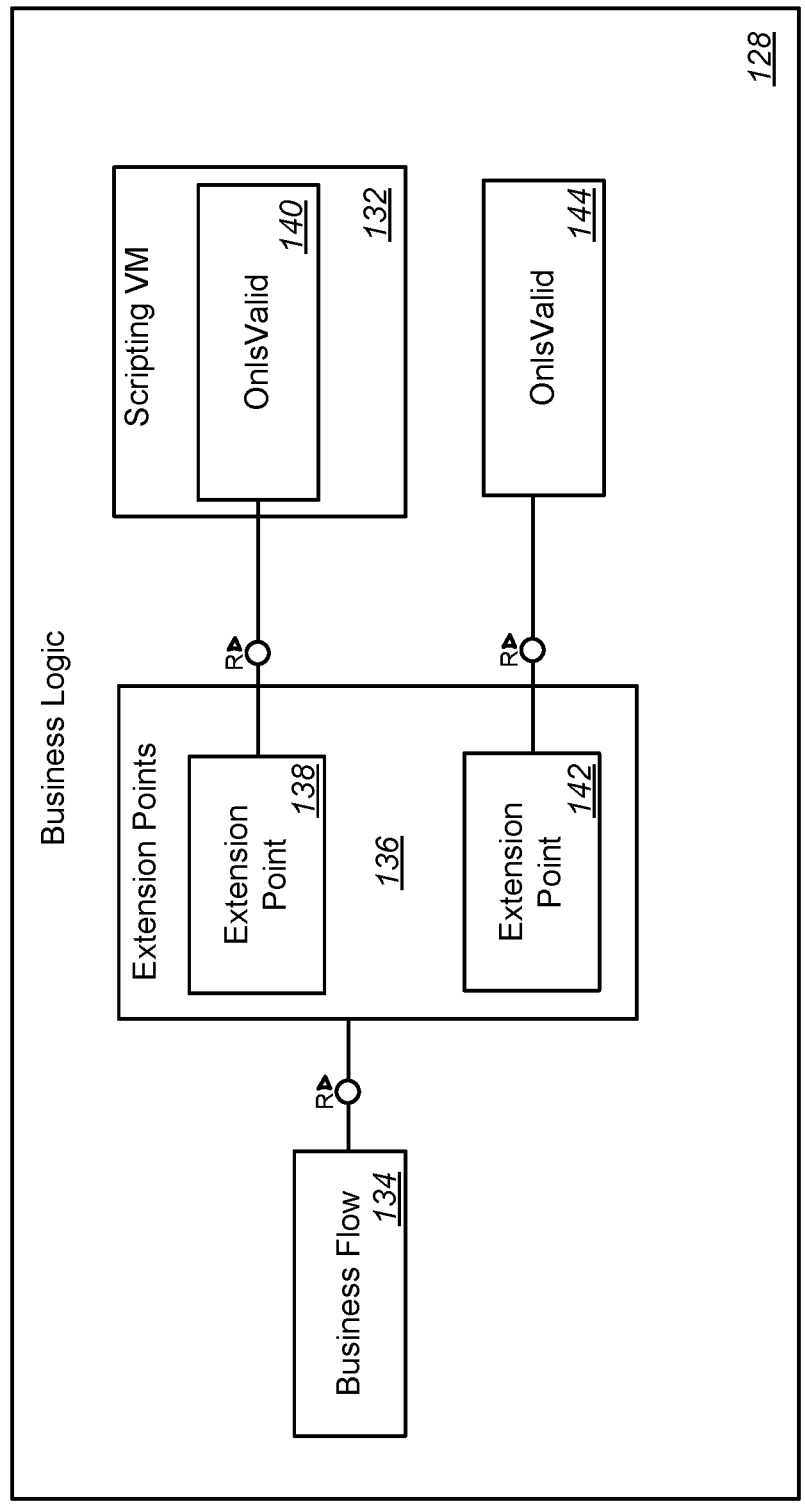

FIGS. 1A-1B are block diagrams of an example system 100 for converting business logic architecture from a native language to a scripting language. FIG. 1A illustrates an example server-client system 100 that can be accessed to convert and/or update business logic for an SaaS ERP software application. In particular, the system 100 may be configured to provide access to a scripting language runtime (e.g., a virtual machine) embedded in an SaaS ERP system 102. For example, a client device 104 (e.g., a software developer) can access a scripting language runtime (via scripting business logic application 106) to begin generating code portions in a scripting language. The code portions can be used to replace existing compiled code for executing business logic in the SaaS ERP system 102.

The client device 104 can provide access to the scripting language runtime (via scripting business logic application 106), which may be provided by enterprise software application 108 and/or SaaS Enterprise Resource Planning system 102, each executing at one or more server devices. The software developer can interact with graphical elements and development elements in application 106 and system 102 and application 108 can provide resources for developing business logic in a scripting language. The scripting language can allow a software developer to generate scripts to access and control one or more software applications and services.

Scripts are typically written in a different language than the native application code (e.g., processor-compiled application code) and are often created and/or modifiable by an end-user. Scripts can be interpreted from source code or bytecode, whereas the applications the scripts function to control are traditionally compiled to native machine code. In some implementations, scripts can be written to interpret and automate execution of tasks. In some implementations, the systems and methods described herein can utilize scripting languages to improve development efficiency when updating software service architecture while maintaining functional software.

The scripting languages described herein can include, but are not limited to ABAP for SAP, APEX for SALESFORCE, SUITESCRIPT for NETSUITE, and/or open source scripting languages such as JAVASCRIPT, PYTHON, LUA, LISP, ANGEL SCRIPT, and SQUIRREL, etc. Other languages are, of course, possible.

Referring again to FIG. 1A, the SaaS ERP system 102 can include (or have access to) enterprise software application 108 directly or over a network 110, for example. The enterprise software application 108 represents computer software used to satisfy the needs of a business organization. Enterprise software application 108 generally includes a collection of computer programs (i.e., software applications and repositories) with common business applications, tools for modeling how an organization functions, and development tools for building applications unique to the organization. The enterprise software application 108 can be used in combination with system 102 and 104 to improve enterprise productivity and efficiency by providing business logic support functionality and access to updating said functionality.

The SaaS ERP system 102 includes a business logic analyzer 112, a scripting engine 114, an extension point generator 116, a garbage collector 118, and a virtual stack 119. The business logic analyzer 112 may be configured to obtain and parse executable code to define one or more generic processes that pertain to software services. For example, obtaining and parsing one or more of the scripts includes retrieving at least one code portion from a script repository. The scripts may be obtained based on at least a localization (i.e., different language, regional preferences, and technical requirements of a target market) corresponding to a service request associated with the service. For example, if a particular service request is to determine manufacturing components available for a product build to occur in Japan, then the system 102 can obtain scripts for querying manufacturing components localized and adapted for particular Japanese regional requirements or preferences. All other scripts may be overlooked in light of the understanding that the requester is interested in services being carried out with respect to a target market in Japan. For example, the business logic analyzer 112 can generate one or more business process patterns 126 and scripts to be stored in a script repository 127. Such patterns 126 can be used to design software that can potentially be adapted to various languages and regions, such as Japan, in the above example.

Localization of particular components can be performed to define generic processes to be carried out for a number of different locales. Defining one or more generic processes may include determining that an update to particular business logic is available and generating a pattern for one or more generic processes if the update is available. Defining a generic process may also include obtaining one or more scripts in a scripting language to implement the update to the business logic according to the pattern.

In some implementations, the scripting engine 114 is also configured to embed a scripting language runtime into the software application. The scripting language runtime may be configured to execute one or more scripts and the embedding can function to limit memory resources that the runtime may consume during execution.

The scripting engine 114 may be configured to cause a processor to generate scripts for executing business logic associated with at least one software service. The scripts may be configured to replace a portion of processor-compiled architecture in a software application. The scripting engine may be configured to access the extension point generator 116, the garbage collector 118, and the business logic analyzer 112.

In some implementations, the scripting engine 114 may determine portions of a service that include business logic to be carried out by processor-compiled architecture. In addition, the scripting engine 114 may determine other portions of the service that include business logic to be carried out by scripted architecture. Once the service is analyzed for execution and organized for order of execution, the scripting engine 114 may execute the service using a scripting language interface. The execution may include organizing the portions of the service and the other portions of the service according to the one or more generic processes described above. The execution may also include generating a function call to each portion of the service that includes business logic to be carried out by the processor-compiled architecture and generating a service call to the service by retrieving and executing at least one code portion from a script repository 127.

In some implementations, the scripting engine 114 is also configured to perform a number of processes during execution of a particular service. For example, if the scripting engine 114 executes a service request and encounters an extension point, the scripting engine 114 may perform a search in a script repository (e.g., script repository 127) to select a relevant scripts that correspond to at least one generic process called out in the business logic for the service. The scripting engine 114 can then select two or more scripts to be executed based on the at least one generic process.

In some implementations, the scripting engine 114 includes some or all components 112, 116, 118, 120, 122, 124, 126, and 127. In addition, the scripting engine 114 may have or provide access to core logic 120, extensibility logic 122, and localization logic 124, as described in further detail below.

The extension point generator 116 may be configured to define a number of extension points corresponding to business logic. The extension points may represent an interface, within the business logic, in which to insert at least one script into the processor-compiled architecture;

The garbage collector 118 may be configured to automatically manage memory. For example, the garbage collector 118 can run within a virtual machine to collect and reclaim memory occupied by objects that are no longer being accessed or used.

The virtual stack 119 may be configured in a virtual machine to access a number of scripts and to exchange data between scripted architecture and processor-compiled architecture. The virtual stack may have a number of slots. Each slot may be configured to hold a value associated with the scripted architecture.

The enterprise software application 108 shown here includes processor-compiled business logic 128 and business objects 130. Both processor-compiled business logic 128 and business objects 130 can provide information as a service to system 102.

Referring again to FIG. 1A, in operation, the SaaS ERP system 102 can be communicatively coupled to device 104. Device 104 can access application 108 and any associated software applications. Device 104 can be connected (wired or wirelessly) to application 108, which can provide business data, user interfaces, and facets for display. In some implementations, the computing device 104 can execute application 108 to access business content and/or services.

In some implementations, one or more additional servers and one or more computer-readable storage devices can communicate with system 102 and/or application 108 using network 110 to provide business content and services to the client device 104. In some implementations, the network 110 can be a public communications network (e.g., the Internet, cellular data network, dialup modems over a telephone network) or a private communications network (e.g., private LAN, leased lines). In some implementations, the computing devices shown here can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Although only two computing devices are depicted in FIG. 1A, the example system 100 may include a plurality of computing devices that can exchange data over a network 110 (or additional networks not shown). The computing devices 102 and 104 may represent clients or servers and can communicate via network 110, or other network. Example client devices may include a mobile device, an electronic tablet, a laptop, or other such electronic device that may be used to access business content from system 102. Each client device 104 can include one or more processors and one or more memory devices. The client devices 104 can execute a client operating system and one or more client applications that can access, control, and/or display business data on a display device included in each respective device. The system 102 may represent a server device. In general, the system 102 may include any number of repositories storing content and/or business software modules that can be accessed to generate business logic in a scripting language.

Additional devices are possible and such devices may be configured to be substituted for one another. In some implementations, the devices 102 and 104 can be laptop or desktop computers, smartphones, personal digital assistants, portable media players, tablet computers, gaming devices, or other appropriate computing devices that can communicate, using the network 110, with other computing devices or computer systems.

FIG. 1B is a block diagram of an example of architecture for utilizing business logic using an embedded scripting language. The architecture can obtain and access processor compiled business logic 128 to generate scripts that function to carry out such logic. In order to write (i.e., script) business logic in non-disruptive way, a scripting virtual machine 132 (e.g., a scripting language runtime) can be embedded into the enterprise software application 108 or into the SaaS ERP system 102. In this example, business flow 134 can be retrieved from system 102 or application 108. The retrieved business flow 134 may be directly accessed or generated based on business logic coded and compiled for C/C++ language (or other compile-able language). The business flow 134 can define tasks carried out in a particular business process.

The business flow 134 can be analyzed to determine where extension points 136 can be inserted into the business logic. The extension points 136 may represent an insertion location configured to be a placeholder for inserting one or more code portions (i.e., scripts) into processor-compiled architecture in an ERP application. That is, the scripts may be interleaved with processor-compiled and executing code by inserting extension points that can perform calls to the scripts at appropriate times within the business flow. For example, an extension point 138 may be generated and placed within a sales order business process to ensure that when the sales order process is called, scripts associated with the extension point 138 can be executed.

In some implementations, extension points 136 can include a name and a dependent list of tasks that can be executed from a command line. In some implementations, the extension points 136 may function as an insertion location for build files designed to be imported into compileable code. In the imported file, an extension point may define a state to be reached before executing a number of code portions associated with the extension point 136.

In the example shown in FIG. 1B, the extension point can trigger a call to the scripting virtual machine 132 where a validation process (OnIsValid 140) can determine whether the extension point points to one or more other scripts to be carried out for a particular business process associated with the business flow 134. In some implementations, the scripts can be easily modified such that any updates to the business flow/process can be quickly implemented and called during customer usage of system 102 or application 108, for example. Similarly, an extension point 142 can be generated for another portion of the business process, for example, and validity checking can be performed (e.g., OnIsValid 144).

Figure 2:
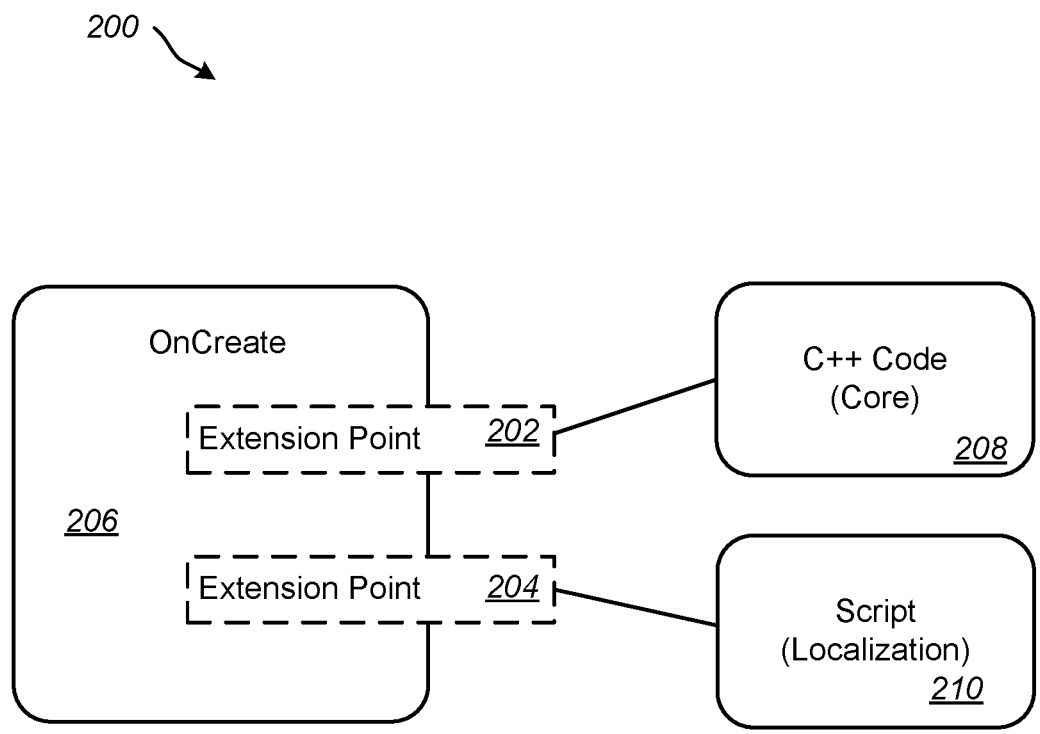
FIG. 2 is a block diagram of example architecture of extension points.

FIG. 2 is a block diagram of example architecture 200 of extension points. Architecture 200 can be used to generate add-in software for business logic. Add-in software can be used as a way to allow a number of different customers to customize and validate business processes without the activity of rewriting their software applications. In an example ERP application, flexible business logic can be scripted as add-in software. One customer may indicate that the place of business is a mandatory field in a sales order. A different customer may indicate that the place of business is an optional field in a sales order. Each customer can generate a script to ensure that the field remains optional or remains mandatory. To do so, architecture 200 can be used to define a number of extension points (e.g., extension point 202 and extension point 204), such that when an OnCreate function is called, extension point 202 points to core native logic 208 written in a native programming language (e.g., C, C++, etc.) for the application while extension point 204 points to a script 210.

The scripts may include one or more code portions that correspond to one or more business process patterns (i.e., that underlie the business logic) and that may be associated with an underlying business process (e.g., a sales order request). The code portions may be coded in a scripting language and stored in the script repository 127. However, some business logic may remain in the native language, as the architecture 200 can use an extension point 202 to enable core native logic 208 to execute. Similarly, the architecture 200 can instead use an extension point 204 to enable script 210 to execute.

In general, code portions that are associated with extension points can be stored in the script repository 127. For each code portion, an extension point having a component identification format can be generated. The component identification indicates where and when a particular script (code portion) should be executed (e.g., called). The component identification format may include a business object type, a business process pattern identifier, a logic layer identifier, and a local location identifier.

In a non-limiting example, the component identification may take the following form:

[ObjectType]-[BusinessFlow]-[Before|After]-[Localization]

The[ObjectType] defines which business object the script will apply to. The [BusinessFlow] defines which business flow process (or portion of a process) is configured to call the script. [Before|After] represents an order for particular business logic being called and executed. For example, localization business logic and extensibility business logic may be executed before or after core business logic. [Localization] may represent local requirements or preference information.

The following is a code portion detailing the business process of creating a sales order:

---

Code Portion I

```
SBOErr COrder::Create( )
{
  ...
  ooErr = CompleteCustomer( );
  ooErr = ValidateCustomer( );
  ooErr = UpdateCustomerBalance( );
  for(int row = 0; row<ProdcutLines.size( ); row++)
  {
    ooErr = CompleteProductLine(row);
    ooErr = ValidateProductLine(row);
    ooErr = CalculateLineTotal(row);
    ooErr = UpdateProductInventoryValue(GetProductInfo(row));
  }
  ooErr = SaveDocument( );
  ...
  return ooErr;
}
```

---

In the application 108, the business logic 128 may prescribe how business objects interact with one another and may enforce the routes and the methods by which business object are accessed and updated. In a non-limiting example, the code portion I above details code for creating a sales order. When a sales order is created (either through a user interface or by open API), the backend business logic typically includes validation of user input, completion of data, updating of order status, persisting the sales order to a database, and so on. This backend business logic can be thought of as a business process (i.e., business flow).

A typical business flow may include completing user input, validating user input, persisting business object state in a repository, and updating related business objects. For example, a portion of business logic can be scripted to obtain a default address for a customer if a user does not input the address. Similar completion of user input can include calculating a total sales order amount based on a price, a quantity, a discount, a tax group, etc. Validation of user input can, for example include checking whether a customer exists, checking stock levels, checking credit, etc. Updating other related business objects can include recalculating stock values for products, updating customer balances, updating reporting procedures or shipping procedures, etc.

The following code portion is a refined version of the above process of creating a sales order:

---

Code Portion II

```
SBOErr COrder::OnAutoComplete( )
{
  ...
  ooErr = CompleteCustomer( );
  for(int row = 0; row < ProductLines.size( ); row++)
  {
    ooErr = CompleteProductLine(row);
  }
  ...
  return ooErr;
}
SBOErr COrder::OnIsValid( )
{
  ...
  ooErr = ValidateCustomer( );
  for(int row = 0; row < ProductLines.size( ); row++)
  {
    ooErr = ValidateProductLine(row);
  }
  ...
  return ooErr;
}
SBOErr COrder::OnCreate( )
{
  ...
  ooErr = UpdateCustomerBalance( );
  for(int row = 0; row < ProductLines.size( ); row++)
  {
    ooErr = CalculateLineTotal(row);
    ooErr = UpdateProductInventoryValue(GetProductInfo(row));
  }
  ooErr = SaveDocument( );
  ...
  return ooErr;
}
SBOErr COrder::Create( )
{
  ...
  ooErr = OnAutoComplete( );
  ooErr = OnIsValid( );
  ooErr = OnCreate( );
  ...
  return ooErr,
}
```

---

Figure 3:
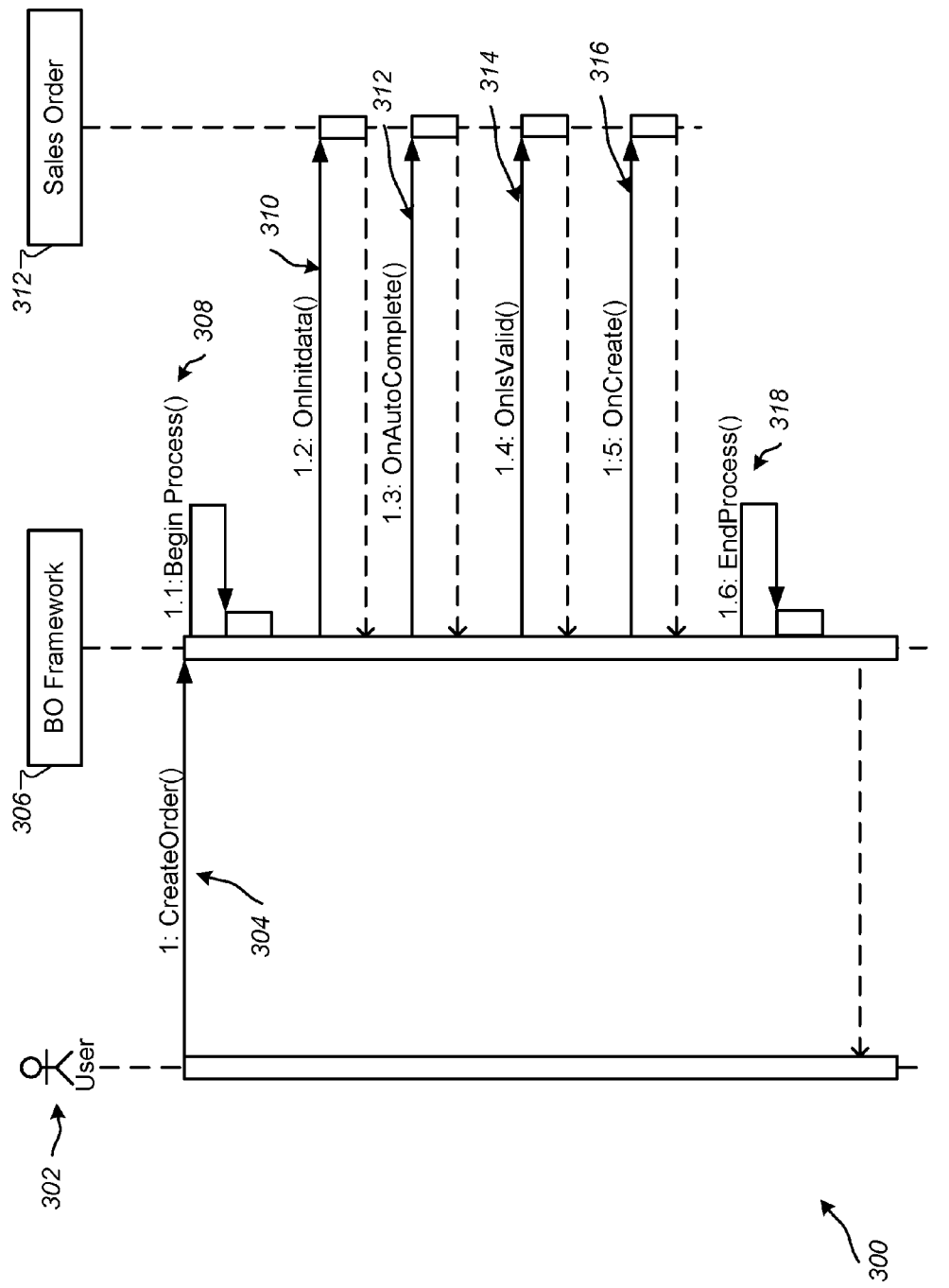
FIG. 3 is a swim lane diagram illustrating an example of refining a business process.

FIG. 3 is a swim lane diagram illustrating an example of refining a business process. Here, the flow of the business process is organized using a pattern that defines a skeletal version of the business process as well as each business object that is used in the business process. The example shown in here is for creating a sales order.

Different business processes may have different business logic associated with such processes, but each business process includes a similar business flow, for example, autocomplete, validate, update, create, etc. In order to manage the business logic the business flow can be refined into a pattern that divides standard business flow into portions that each focus on a single task or related group of tasks. For example, validate may focus on checking that user input and business object status is accurate and available.

An example refined flow for the business process described above may include generating a pattern for the business flow. For example, a user 302 may access an ERP system 102 (or application 108) to request to create a sales order (e.g., CreateOrder( ) 304). The refined flow may access business object framework 306 to begin generating the sales order (e.g., BeginProcess( ) 308). The business object framework 306 may initiate data used in the sales order (e.g., OnInitdata( ) 310) by sending a request to the sales order business object 312. The sales order business object 312 can function to autocomplete any data that can be automatically accessed and filled in the sales order (e.g., using OnAutoComplete( ) 312. Next, the business object framework 306 can request the sales order business object 312 to determine whether data entered by the user into the sales order is valid (e.g., using OnIsValid( ) 314). Upon determining that the data is valid, the business object framework 306 can request to generate the sales order and the sales order business object 312 can create the sales order (e.g., (using OnCreate( ) 316). If the sales order is created with success, the process can end (e.g., EndProcess( ) 318). Extension points can be added to the business process/flow to enable code portions to be scripted to carry out the above-defined patterns.

Figure 4:
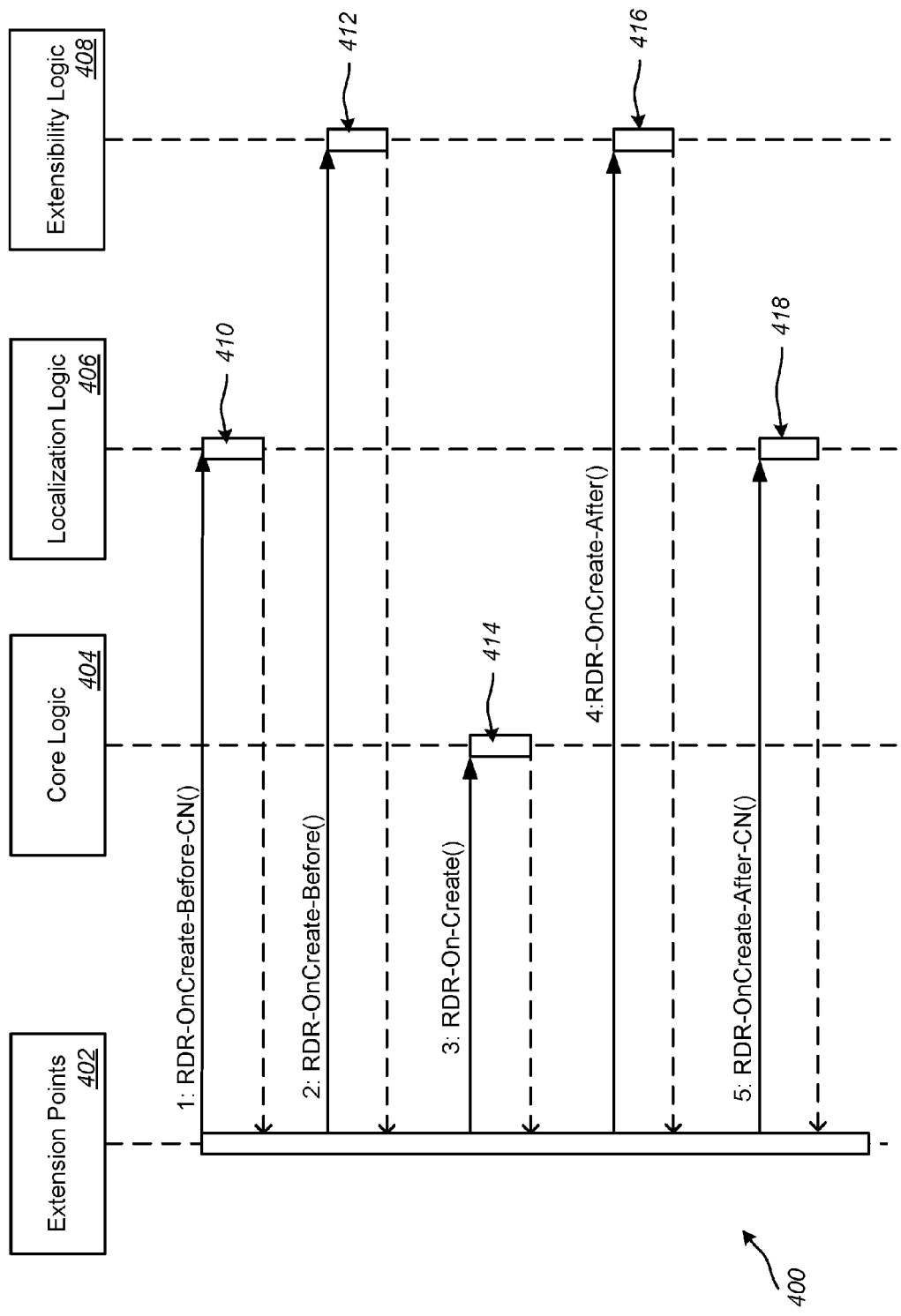
FIG. 4 is a swim lane diagram illustrating an example of utilizing extension points and business logic.

FIG. 4 is a swim lane diagram 400 illustrating an example of utilizing extension points and business logic in an example execution sequence. Such business logic may include three categories (i) core (global) business logic, typically written by in-house developers, and configured as common business logic for all localization and industries (ii) localization business logic, typically written by in-house developers and business partner developers, and configured for particular localization, and (iii) extensibility business logic, typically written by business partner developers, and configured as an add-in for special industry and/or customer. In some implementations, the localization and extensibility business logic depend on core business logic and can be called both before and after core logic execution.

In this example, extension points 402 can trigger the execution of core logic 404, localization logic 406, and extensibility logic 408. A number of component identifiers shown in diagram 400 include RDR-OnCreate-Before-CN( ) 410, RDR-OnCreate-Before( ) 412, RDR-OnCreate( ) 414, RDR-OnCreate-After( ) 416, and RDR-OnCreate-After-CN( ) 418.

Based on the definition for sales order business objects, the component identifier RDR-OnCreate-CN-After( ) may indicate that the scripting language code portion will be called after OnCreate( ) in CN(China) localization when a sales order is created. Similarly, if a journal entry were to be requested for generation a component identifier JDT-OnUpdate-XX( ) will be the called when Journal Entry function OnUpdate( ) is called in all locales. In this example, an "ObjectType" may be defined with an abbreviation of the business object name such as "RDR" for a sales order or "JDT" for a Journal Entry.

In each extension point 402, the SaaS ERP system 102 can search the script repository 127 to find all proper code portions (e.g., scripts) to execute. For example, in OnCreate( ) an extension point 402 directed to a sales order of create process, the following steps may be performed. (1) Find all code portions which begin with "RDR-OnCreate-Before . . . " in the script repository 127. If any code portions are found, the system 102 executes the code portions. Then, the C/C++ native code can be executed (or continue to be executed) at its OnCreate( ) code. The system 102 can broaden the search to find code portions that begin with the name RDR-OnCreate-XX in the script repository 127 and can execute any found code portions. Next, the system 102 can find code portions that begin with RDR-OnCreate-After in the script repository 127 and can execute any found code portions.

By this mechanism, the business logic can be rewritten over time in a scripting language in a non-disruptive manner. In beginning, all the business logic may be in the form of native code (i.e., C/C++ functions). If there is a new or enhanced feature of creating a sales order in China, for example that affects the OnCreate( ) code, the system 102 can simply write business logic scripts for RDR-OnCreate-Before-CN and RDR-OnCreate-After-CN. The other portions of creating a sales order can remain unchanged and can be executed as is typical in a compiled executable software application. In some implementations, the system 102 can move core business logic from OnCreate( ) to RDR-OnCreate-XX in a step-by-step manner. At some point, all functions in the native code (e.g., the C/C++ coded application) may be replaced with scripts (code portions) drafted in the scripting language. At that point, the OnCreate( ) function in the native code may be empty and upon being called will execute nothing.

In operation of swim lane diagram 400, at least one extension point 402 is triggered by a user or triggered automatically to begin creating a sales order for China. Functions can be searched to identify code that performs steps slated for completion before sales orders are created in China. For example, RDR-OnCreate-Before-CN( )410 is called in the localization logic 406. Next, additional code is searched to find other OnCreate( )functions that may be performed using RDR-OnCreate-Before( )412, which is performed by extensibility logic 408. Next, the core logic 404 can perform the actual creation steps using RDR-OnCreate( )414. The extensibility logic 408 can be called again to search and execute post-creation code using RDR-OnCreate-After( )416. Lastly, the localization logic 406 can call and execute additional code related to specific location information (e.g., China) using RDR-OnCreate-After-CN( )418.

Figure 5:
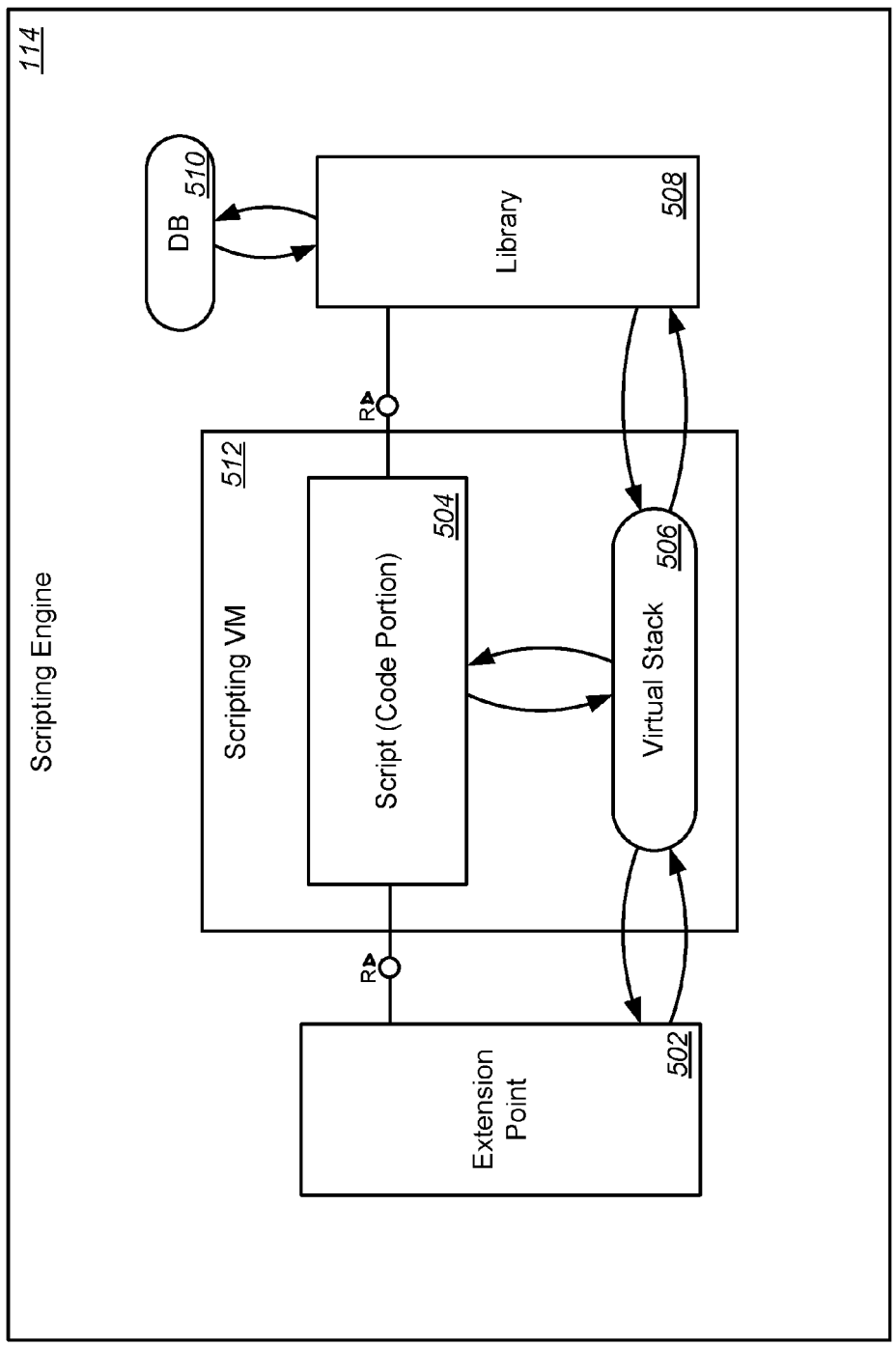
FIG. 5 is a block diagram of example of exchanging data in an SaaS ERP application.

FIG. 5 is a block diagram 500 of example of exchanging data in an SaaS ERP application. Exchanging data between a scripting language and a C/C++ language can be difficult because there may be (i) a mismatch between a dynamic and a static type of system and (ii) a mismatch between automatic and manual resource management. To solve these issues, a virtual stack can be generated, where each slot of the virtual stack can hold any value of scripting language. Before a scripted code portion is called, the scripting engine 114 can push the data that the scripting language will use onto the virtual stack and during the scripting language run time, the data can be popped from the virtual stack when requested. Moreover, the virtual stacks that are generated may reside in the scripting language runtime, and as such the memory can be automatically managed, using a garbage collector (GC), for example.

The diagram 500 depicts a scripting engine 114 being able to tailor scripting language for business logic development tasks. In some implementations, the scripting engine 114 can employ open source embedded scripting languages such as LUA, PYTHON, and RUBY to code scripts that carry out business logic. The scripting engine 114 can be used to enhance the scripting language by adding functionality to be carried out by the SaaS ERP system 102. In some implementations, the scripting engine 114 can include functionality for accessing general settings, querying database repositories, accessing business objects properties, etc. and so on. In the SaaS ERP system 102, a framework layer already provides such functions. In an on-premise environment, programming layers are typically written in the same language (e.g., C/C++) and accordingly, the application code can call such functions directly. However, for scripting languages, code may be executed inside a virtual machine and is tasked to exchange data with the ERP runtime when calling such functions.

In operation, the scripting engine 114 in the SaaS ERP system 102 can receive a request to execute a service. The service can include tasks generated by both processor compiled languages (e.g., functions) and tasks generated by scripting languages (e.g., direct service calls). The service can begin to execute application code called within the SaaS ERP system 102. In the event that an extension point 502 is encountered, the service can be redirected to a script 504 (e.g., code portion) intended to replace application code associated with processor-compiled architecture. For example, the extension point 502 may represent an insertion location for inserting one or more code portions (i.e., scripts) 504 into processor-compiled architecture in an enterprise resource planning application. The extension point 502 may also point to or otherwise have access to a virtual stack 506. The virtual stack can access a library 508 that includes a number of libraries and code portions that can be retrieved from a database 510. The code in library 508 and corresponding database 510 can include whitelisted and blacklisted content in order to provide security when providing services to the SaaS ERP system 102.

When an extension point (e.g., extension point 502) is reached, the scripting engine 512 can access a script 504, verify with the library 508 that the script is secure and whitelisted, and upon determining secureness, the scripting engine 114 can push the data that the scripting language will use onto the virtual stack 506. During the scripting language execution time, the data can be popped from the virtual stack 506 when requested. The script 504 and the virtual stack 506 are shown here executing in a sandboxed scripting virtual machine 512, as described in detail below.

Figure 6:
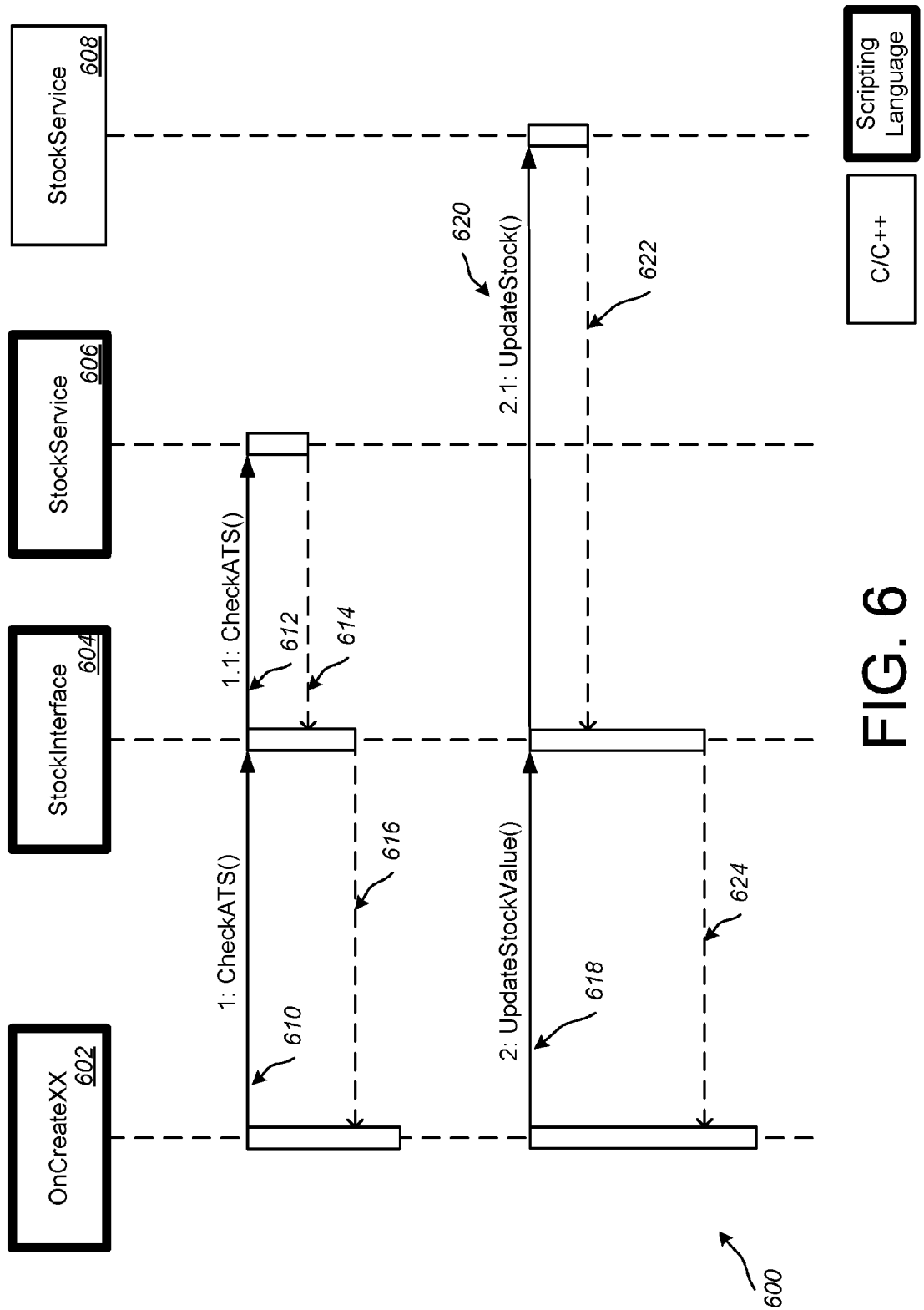
FIG. 6 is a swim lane diagram illustrating an example of calling services.

FIG. 6 is a swim lane diagram 600 illustrating an example of calling services. In this example, one business object may call a number of other business objects. For example, business logic stored with one business object may be useful if executed alongside or subsequent business logic stored with other business objects and accordingly, can be combined. One example may include creating a sales order in which a stock value is also verified. In this example, the sales order business object and the stock value business object are utilized.

In the depicted example, the SaaS ERP system 102, when creating a sales order, may check the product stock value available to sell (ATS) associated with the product in the sales order. The ATS represents a service provided with information in an inventory business object.

In general, there may be two categories of such services (i) services written in a scripting language or (ii) services written in native processor-compiled languages. For every service, the SaaS ERP system 102 can provide a scripting language interface (e.g., via scripting engine 114). If business logic is determined to have been written by a scripting language, the ATS service can be called directly. If instead, the business logic is determined to have been written in a processor-compiled language (C/C++), the ATS service and business object can be called via a function, similar to calling a C/C++ library.

As shown in FIG. 6, the OnCreateXX code portion 602, a StockInterface code portion 604, and a StockService code portion 606 are written in scripting language while a StockService function 608 is written in a processor-compiled language. In this example, a particular entity calling the service or function may not be privy to which programming language the service uses (i.e., is programmed in). Therefore, the SaaS ERP system 102 can generate business logic in a scripting language and replace any processor-compiled functions with such scripted business logic. This can be accomplished without interrupting the use of the software. For example, the software will not be recompiled, rebuilt, updated, etc. The software can be modified to simply perform calls to different portions of code that have been scripted in a scripting language and that carry out identical service offerings as an original processor-compiled software application. For example, an extension point 138 may be generated and placed within a sales order business process to ensure that when the sales order process is called, scripts associated with the extension point 138 can be executed.

In operation, the OnCreateXX code portion 602 may be called at route 610 and can be configured to call a CheckATS( ) code portion. In response to calling the CheckATS( ) code portion, the StockInterface code portion 604 may call a CheckATS( ) code portion at route 612 to execute the StockService code portion 606, which can respond with the ATS answer at route 614 and continue along route 616 with the answer at the OnCreateXX code portion 602.

Next, the OnCreateXX code portion 602 can use the ATS answer to perform UpdateStockValue( ) code portion at route 618. This can trigger the StockInterface code portion 604 to call an UpdateStock( ) code portion at route 620, which may call StockService function 608. StockService function 608 includes C/C++ processor compiled code that can be carried out based on the scripts called at 610-618. The stock can be updated and the StockService function 608 can provide information at route 622 to the StockInterface code portion 604, which can relay the information to the OnCreateXX code portion 602 via route 624.

Figure 7:
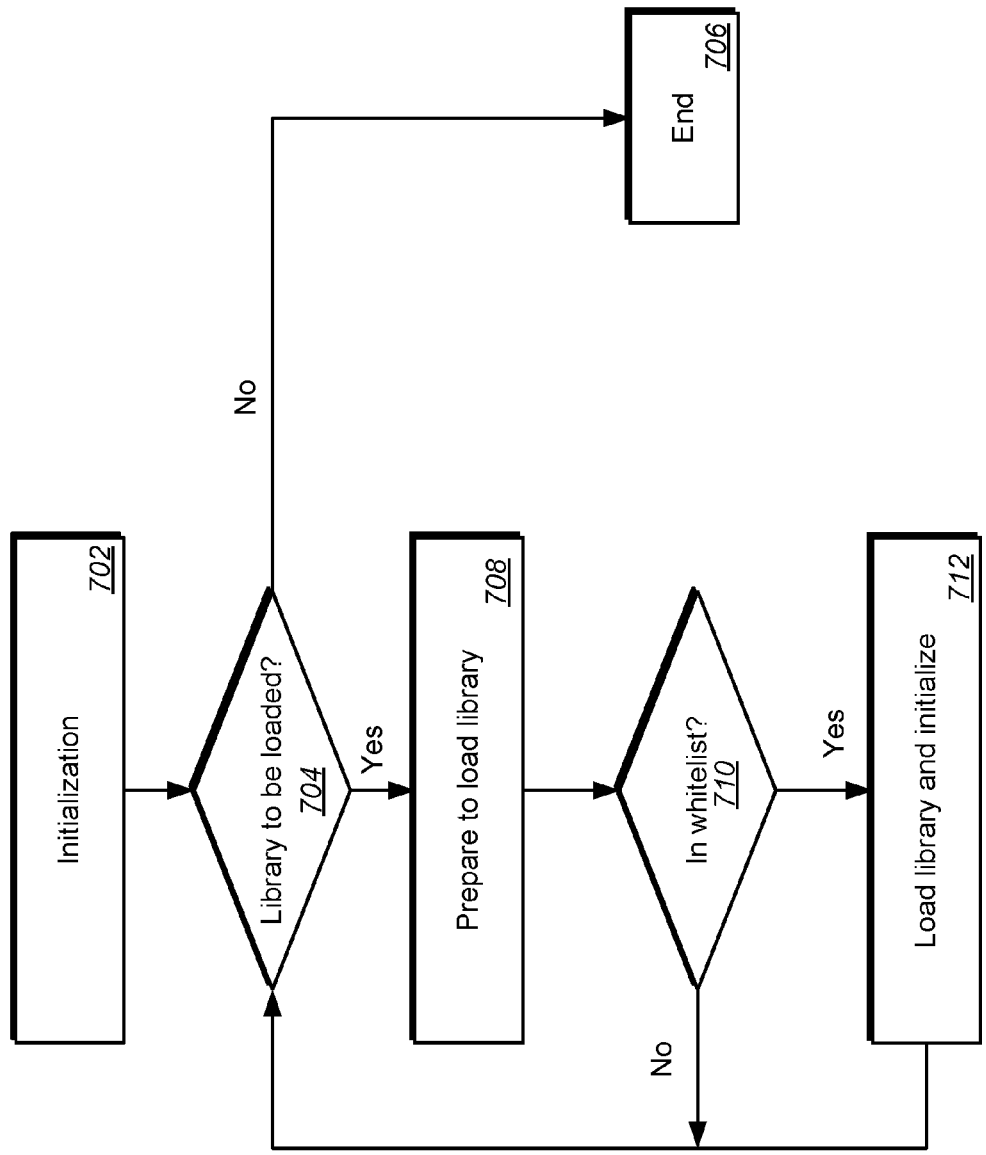
FIG. 7 is a flowchart illustrating example operations for loading a library process.

FIG. 7 is a flowchart illustrating an example process 700 for loading a library process. The library process 700 can be performed, for example, by SaaS ERP system 102 (e.g., scripting engine 114) or enterprise software application 108. The systems and methods described herein permit usage of the scripting language by in-house developers for core and localization business logic as well as customer and business partner developers for extensibility and localization business logic. Since open source scripting languages can be used, security can be maintained by implementing a sandbox environment, which restricts some features such as accessing local files, accessing network files, and multithread access rules. The sandbox environment can be configured to maintain a whitelist of safe libraries and a blacklist of known unsafe libraries.

During virtual machine initialization and for each library request received from a virtual machine, the process 700 can begin initialization at step 702 by determining if there exists a library to be loaded, at step 704. If there are no libraries to load, the process can end, at step 706. If, however, there is one or more libraries to be loaded, the system can prepare to load the library at step 708 and determine whether or not the one or more libraries is listed in a whitelist, at step 710. If the one or more libraries are not in the whitelist, the process 700 can include performing additional checks, or simply ignore and/or deny addition of the libraries without further information. If the one or more libraries are in the whitelist, the one or more libraries can be loaded and initialized at step 712.

Figure 8:
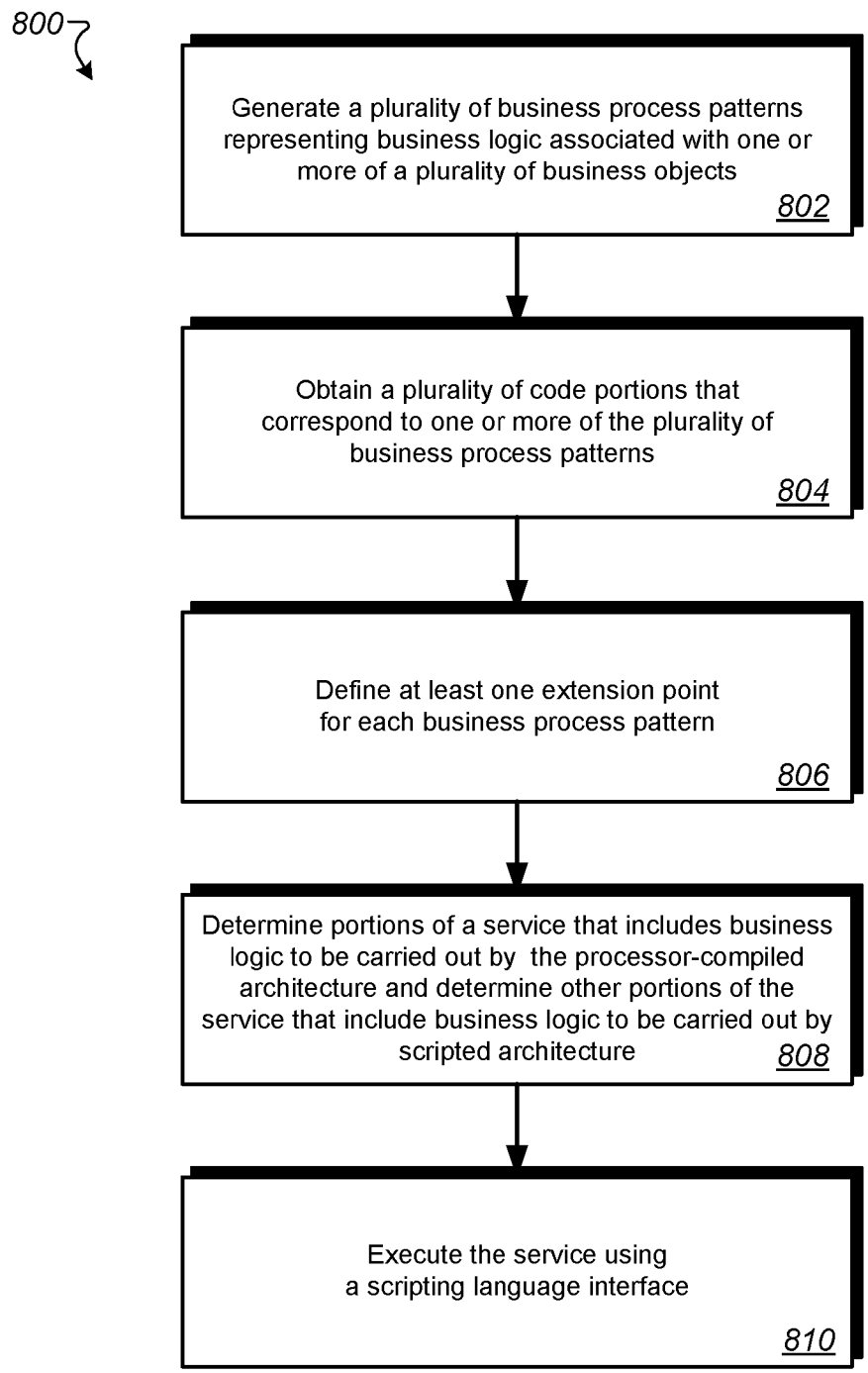
FIG. 8 is a flowchart illustrating example operations of the system of FIG. 1.

Referring to FIG. 8, an exemplary flowchart illustrates a process 800 for implementing the system of FIG. 1. The process 800 can be performed, for example, by SaaS ERP system 102 (e.g., scripting engine 114) or enterprise software application 108. Process 800 includes generating, by a processor, a plurality of business process patterns representing business logic associated with one or more of a plurality of business objects.

The process 800 also includes obtaining a plurality of code portions that correspond to one or more of the plurality of business process patterns. The plurality of code portions may be coded in a scripting language and stored in a script repository. The scripting language may be an open source embedded scripting language. Retrieving code portions from the script repository may include retrieving code configured for user preference data pertaining to localization information or particular location data corresponding to the business process.

In some implementations, the business process patterns may be generated by obtaining and parsing, by the processor, processor-compiled architecture in an enterprise resource planning application to define a generic process and determining that an update to the business logic is available. If there is an update to business logic available and/or if a request has been made to produce an update to the business logic, then the system 102 can generate additional code portions in a scripting language to implement the update to the business logic. The additional code portions may be architected based on the business process pattern and/or the generic process and can be adapted to replace a part of the processor-compiled architecture. In some implementations, the business process pattern includes an ordered template for generating code portions, in a scripting language, for executing a portion of the business logic.

The process 800 also includes defining at least one extension point for each business process pattern. Each extension point may represent an interface, within the business logic, in which to insert one or more of the plurality of code portions into processor-compiled architecture in a software application. In some implementations, the at least one extension point may be configured to be a placeholder for inserting one or more code portions into processor-compiled architecture in an enterprise resource planning software application.

The process 800 may also include determining portions of a service that include business logic to be carried out by the processor-compiled architecture and determining other portions of the service that include business logic to be carried out by scripted architecture. This can be determined in response to receiving, at the processor, a request to execute the service associated with the software application.

In addition, the process 800 can include executing the service using a scripting language interface. The executing can include organizing the portions of the service and the other portions of the service according to the business process pattern. The executing may also include generating a function call to each portion of the service that includes business logic to be carried out by the processor-compiled architecture and generating a service call to the service by retrieving and executing at least one code portion from the script repository.

In some implementations, the process 800 may include embedding a scripting language runtime into the software application. The scripting language runtime may be configured to execute the at least one code portion in a virtual machine to limit memory resources that the scripting language runtime consumes during execution.

In some implementations, the process 800 includes, during execution of the business process and at each extension point, performing a search in the script repository to find a plurality of relevant code portions that correspond to a selected business process pattern, and selecting two or more code portions to be executed based on the selected business process pattern.

In some implementations, an exchange of data between scripting language architecture and the processor-compiled architecture can be performed using a virtual stack having a plurality of slots. Each slot may be configured to hold a value of scripting language architecture to offset a mismatch between automatic and manual resource management.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Business logic and business applications described herein may include any type of business application (e.g., a software application including business logic for accounting, customer relationship management, human resource management systems, outsourcing relationship management, field service software, enterprise resource planning, enterprise resource management (ERM), enterprise content management (ECM), business process management (BPM) and product lifecycle management, etc.). The business application may be hosted on one or more servers in a networked computer system in a server-client configuration. A user may interact with or operate the business application via the client computing device (e.g., a laptop computer, desktop computer, a smartphone, a handheld computing device, etc.). A backend of the business application (e.g., "server application") may run on the server side to hold and process data, which may be obtained, for example, from one or more server-side databases or other network sources. A front end of the business application (or "client application") may run on the client computing device and provide a user interface of the business application on the client computing device.

A server application can be implemented on any of the devices shown in FIGS. 1A-1B. The server application may include "data tables," "data structures" or "data sources," which contain data or links to the data processed or generated by the server application. The data sources may include data of any of a variety of data types (e.g., integers, Booleans, characters, floating-point numbers, complex numbers, text, alphanumeric strings, arrays, matrices, combination data types, etc.).

The server application may include access or links to dynamic data sources on the server (i.e. sources containing data which is updated or refreshed during application runtime). A client application (or other user-application) running on a client computing device as shown in FIG. 1A may be configured to present or display data retrieved from the data sources of the server application on the user interface (e.g., on a display screen) of the client device. Further, non-browser based applications may include static data, which is defined development time. Data from static data sources (e.g., predefined text used with labels and buttons) may be loaded on the user interface during development time, while the data from dynamic data sources (e.g. a field in a database used with edit boxes or combo boxes) may be loaded during runtime.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, the method comprising:
   generating, by a processor, a plurality of business process patterns representing business logic associated with one or more of a plurality of business objects;
   obtaining a plurality of code portions that correspond to one or more of the plurality of business process patterns, the plurality of code portions being coded in a scripting language and stored in a script repository;
   defining at least one extension point for each business process pattern, each extension point representing an interface, within the business logic, in which to insert one or more of the plurality of code portions into processor-compiled architecture in a software application;
   in response to receiving, at the processor, a request to execute a service associated with the software application,
      determining portions of the service that include business logic to be carried out by the processor-compiled architecture and determining other portions of the service that include business logic to be carried out by scripted architecture;
      organizing the portions of the service and the other portions of the service according to a corresponding business process pattern in the plurality of business process patterns; and
      executing the service, the execution including generating a function call to each portion of the service that includes business logic to be carried out by the processor-compiled architecture and generating a service call to the service by retrieving and executing at least one code portion from the script repository to replace processor-compiled functions, in one or more of the portions of the service, with scripted business logic.

2. The method of claim 1, wherein generating the plurality of business process patterns representing business logic associated with one or more of the plurality of business objects includes:
   obtaining and parsing, by the processor, processor-compiled architecture in an enterprise resource planning application to define a generic process;
   determining whether an update to the business logic is available; and
   generating additional code portions in a scripting language to implement the update to the business logic, the additional code portions being architected based on the business process pattern, the additional code portions being in a scripting language and being further adapted to replace a part of the processor-compiled architecture.

3. The method of claim 1, wherein the at least one extension point is configured to be a placeholder for inserting one or more code portions into processor-compiled architecture in an enterprise resource planning software application.

4. The method of claim 1, wherein retrieving the at least one code portion from the script repository includes retrieving code configured for user preference data corresponding to the business process.

5. The method of claim 1, further comprising:
embedding a scripting language runtime into the software application, the scripting language runtime being configured to execute the at least one code portion, wherein the embedding limits memory resources that the scripting language runtime consumes during execution.

6. The method of claim 1, further comprising:
during execution of the business process and at each extension point:
performing a search in the script repository to find a plurality of relevant code portions that correspond to a selected business process pattern; and
selecting two or more code portions to be executed based on the selected business process pattern.

7. The method of claim 1, wherein the scripting language is an open source embedded scripting language and exchange of data between scripting language architecture and the processor-compiled architecture is performed using a virtual stack having a plurality of slots, wherein each slot is configured to hold a value associated with the scripted architecture, the value being used to indicate a mismatch between automatic and manual resource management.

8. The method of claim 1, wherein the plurality of business process patterns define an ordered sequence of tasks to be carried out to execute the process and a plurality of business objects associated with each task.

9. A non-transitory computer-readable storage medium having recorded and stored thereon instructions that, when executed, perform actions of:
generating, by a processor, a plurality of business process patterns representing business logic associated with one or more of a plurality of business objects;
obtaining a plurality of code portions that correspond to one or more of the plurality of business process patterns, the plurality of code portions being coded in a scripting language and stored in a script repository;
defining at least one extension point for each business process pattern, each extension point representing an interface, within the business logic, in which to insert one or more of the plurality of code portions into processor-compiled architecture in a software application;
in response to receiving, at the processor, a request to execute a service associated with the software application,
determining portions of the service that include business logic to be carried out by the processor-compiled architecture and determining other portions of the service that include business logic to be carried out by scripted architecture;
organizing the portions of the service and the other portions of the service according to a corresponding business process pattern in the plurality of business process patterns; and
executing the service, the execution including generating a function call to each portion of the service that includes business logic to be carried out by the processor-compiled architecture and generating a service call to the service by retrieving and executing at least one code portion from the script repository to replace processor-compiled functions, in one or more of the portions of the service, with scripted business logic.

10. The non-transitory computer-readable storage medium of claim 9, wherein generating the plurality of business process patterns representing business logic associated with one or more of the plurality of business objects includes:
obtaining and parsing, by the processor, processor-compiled architecture in an enterprise resource planning application to define a generic process;
determining that an update to the business logic is available; and
generating additional code portions in a scripting language to implement the update to the business logic, the additional code portions being architected based on the business process pattern the additional code portions being in a scripting language and being further adapted to replace a part of the processor-compiled architecture.

11. The non-transitory computer-readable storage medium of claim 9, wherein the at least one extension point is configured to be a placeholder for inserting one or more code portions into processor-compiled architecture in an enterprise resource planning software application.

12. The non-transitory computer-readable storage medium of claim 9, wherein the instructions further comprise:
embedding a scripting language runtime into the software application, the scripting language runtime being configured to execute the at least one code portion, wherein the embedding limits memory resources that the scripting language runtime consumes during execution.

13. The non-transitory computer-readable storage medium of claim 9, wherein the instructions further comprise:
during execution of the business process and at each extension point:
performing a search in the script repository to find a plurality of relevant code portions that correspond to a selected business process pattern; and
selecting two or more code portions to be executed based on the selected business process pattern.

14. The non-transitory computer-readable storage medium of claim 9, wherein the scripting language is an open source embedded scripting language and exchange of data between scripting language architecture and the processor-compiled architecture is performed using a virtual stack having a plurality of slots, wherein each slot is configured to hold a value associated with the scripted architecture, the value being used to indicate a mismatch between automatic and manual resource management.

15. A system comprising:
memory configured to store executable instructions; and
one or more processors configured to execute the stored instructions, wherein execution of the instructions causes the one or more processors to:
generate, by a processor, a plurality of business process patterns representing business logic associated with one or more of a plurality of business objects;
obtain a plurality of code portions that correspond to one or more of the plurality of business process patterns, the plurality of code portions being coded in a scripting language and stored in a script repository;
define at least one extension point for each business process pattern, each extension point representing an interface, within the business logic, in which to insert one or more of the plurality of code portions into processor-compiled architecture in a software application;

in response to receiving, at the processor, a request to execute a service associated with the software application,
    determine portions of the service that include business logic to be carried out by the processor-compiled architecture and determining other portions of the service that include business logic to be carried out by scripted architecture;
    organize the portions of the service and the other portions of the service according to a corresponding business process pattern in the plurality of business process patterns; and
    execute the service, the execution including generating a function call to each portion of the service that includes business logic to be carried out by the processor-compiled architecture and generate a service call to the service by retrieving and executing at least one code portion from the script repository to replace processor-compiled functions, in one or more of the portions of the service, with scripted business logic.

16. The system of claim 15, wherein generating the plurality of business process patterns representing business logic associated with one or more of the plurality of business objects includes:
    obtaining and parsing, by the processor, processor-compiled architecture in an enterprise resource planning application to define a generic process;
    determining whether an update to the business logic is available; and
    generating additional code portions in a scripting language to implement the update to the business logic, the additional code portions being architected based on the business process pattern, the additional code portions being in a scripting language and being further adapted to replace a part of the processor-compiled architecture.

17. The system of claim 15, wherein the at least one extension point is configured to be a placeholder for inserting one or more code portions into processor-compiled architecture in an enterprise resource planning software application.

18. The system of claim 15, wherein retrieving the at least one code portion from the script repository includes retrieving code configured for user preference data corresponding to the business process.

19. The system of claim 15, wherein the instructions further cause the one or more processors to:
    embed a scripting language runtime into the software application, the scripting language runtime being configured to execute the at least one code portion, wherein the embedding limits memory resources that the scripting language runtime consumes during execution.

20. The system of claim 15, wherein the scripting language is an open source embedded scripting language and exchange of data between scripting language architecture and the processor-compiled architecture is performed using a virtual stack having a plurality of slots, wherein each slot is configured to hold a value associated with the scripted architecture, the value being used to indicate a mismatch between automatic and manual resource management.

* * * * *